United States Patent [19]

Viner et al.

[11] Patent Number: 5,050,047
[45] Date of Patent: Sep. 17, 1991

[54] ASSEMBLIES AND APPARATUS FOR LIGHTING ESPECIALLY SPOTLIGHTING

[75] Inventors: Peter Viner, Wetherby, United Kingdom; Stuart L. Moore, 65 Summit Ridge Rd., Stamford, Conn. 06902

[73] Assignee: Stuart L. Moore, New York, N.Y.

[21] Appl. No.: 115,134

[22] Filed: Oct. 30, 1987

[30] Foreign Application Priority Data

Oct. 30, 1986 [GB] United Kingdom ............... 8626033

[51] Int. Cl.⁵ .............................................. F21V 8/00
[52] U.S. Cl. .................... 362/32; 362/125; 362/219; 362/238; 362/240; 362/250
[58] Field of Search ............... 362/32, 33, 61, 125, 362/219, 224, 235, 236, 237, 238, 239, 240, 250

[56] References Cited

U.S. PATENT DOCUMENTS

| | | |
|---|---|---|
| 3,278,739 | 10/1966 | Royka et al. |
| 3,645,254 | 2/1972 | Burton ............................. 128/23 |
| 3,912,918 | 10/1975 | Feinbloom ........................ 362/32 |
| 4,280,122 | 7/1981 | McKinley et al. ................ 362/32 |
| 4,329,737 | 5/1982 | Thiller ............................. 362/32 |
| 4,729,070 | 3/1988 | Chiu ................................ 362/32 |
| 4,745,525 | 5/1988 | Sheehy ............................ 362/32 |

FOREIGN PATENT DOCUMENTS

| | | |
|---|---|---|
| 2814962 | 10/1979 | Fed. Rep. of Germany . |
| 3200938 | 7/1983 | Fed. Rep. of Germany ........ 362/33 |
| 2128909 | 10/1972 | France . |
| 2188099 | 1/1974 | France . |
| 2431659 | 2/1980 | France . |

Primary Examiner—Ira S. Lazarus
Assistant Examiner—Sue Hagarman
Attorney, Agent, or Firm—Cooper & Dunham

[57] ABSTRACT

The invention provides a system of pinpoint lighting comprising a plurality of lens units supplied with light by the separated tail ends of a fiber optic cable of which the remote input end is supplied by a simple light source. The lens provides separate beams of light which are directed at individual articles such as individual items of jewelry in a display case. Each lens unit is adjustable so that the beam direction can be varied on the one hand and the beam intensity can be varied on the other hand.

6 Claims, 3 Drawing Sheets

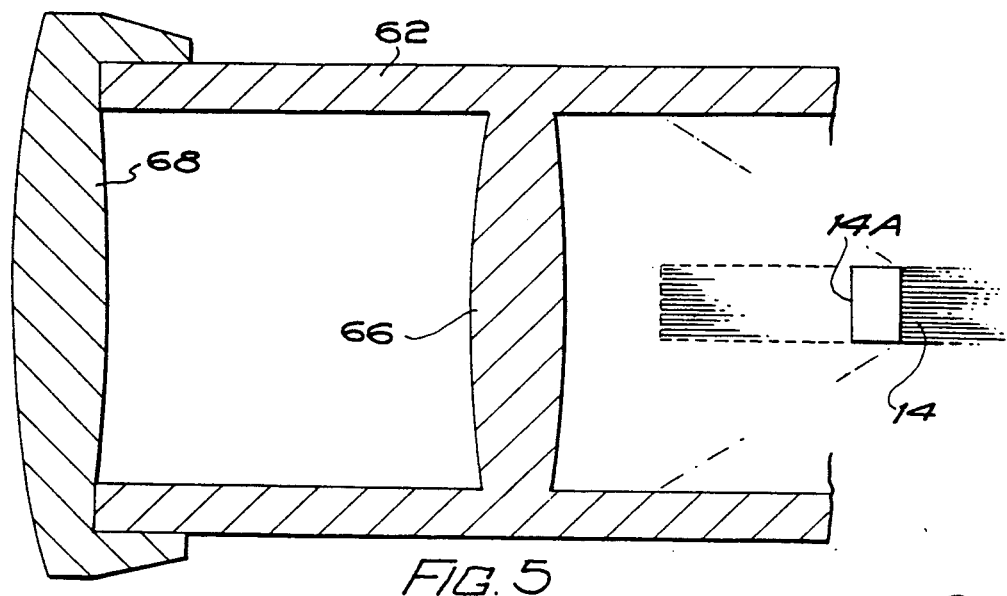
FIG. 5
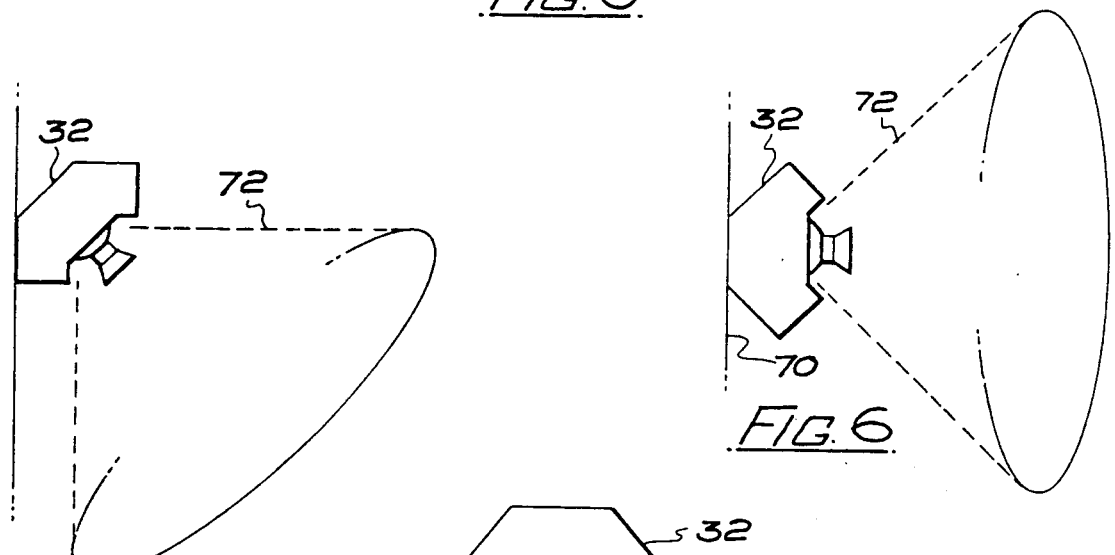
FIG. 6
FIG. 7
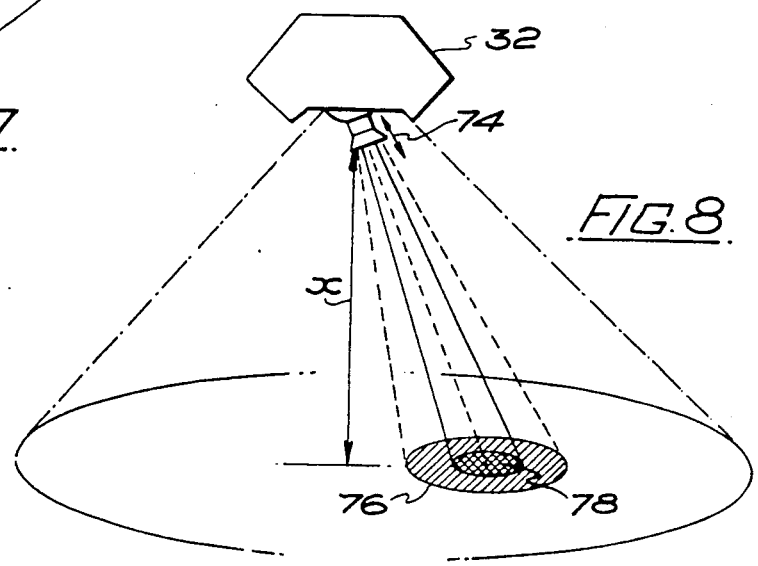
FIG. 8

ASSEMBLIES AND APPARATUS FOR LIGHTING ESPECIALLY SPOTLIGHTING

This invention relates to an assembly for directing a beam of light and apparatus including such assemblies, and has particular although not exclusive reference to the provision of a lighting system wherein a plurality of beams of light are directed to spotlight individual objects or locations at a short distance from the units from whence the light emanates.

It is known, for example in the illumination of individual objects in a display case such as a jewellery display case to use a plurality of individual light sources known as pin spots. The use of these small lights is extremely effective insofar as individual beams highlight the individual items of jewellery in locations in the display case providing an eye catching display and showing off the jewellery to the best advantage.

However the use of individual light sources in this manner does create a number of problems including that the individual light sources are space consuming and heat up with continued use. If the pin spots are used for illuminating heat sensitive objects such as chocolates or delicate manuscripts, then there is a danger that such objects can be damaged as a result of the heat generated by the light sources. Furthermore, the heating of the light sources can result in the heating of the glass in closing the display area, and such glass invariably is within reach of customers, and therefore there is a danger, however slight, of customers being burned by contact with the hot glass.

Additionally, each pin spot must be replaced in the event of failure and specifically each time a bulb in a pin spot fails it has to be replaced and therefore frequent replacing operations can be involved. Finally, it is difficult to achieve coloured lighting effects with individual pin spot light sources.

The present invention derives from an object of providing an improved lighting arrangement to replace the existing individual pin spot lighting arrangements, but it is appreciated that the invention has a somewhat wider application, and indeed it is believed that the particular lens arrangement which is used in the present invention as will be explained hereinafter, is in itself novel and constitutes an inventive step.

Therefore, according to a first aspect of the invention there is provided an assembly for directing a beam of light onto an object or area for illumination purposes, comprising a body having a lens means and defining a light input and a light output, a fibre optic cable having an output end at said light input so that light transmitted along said cable passes through means so as to be focussed by the lens means into a beam emanating from the light output and a mounting receiving the body for angular adjustment whereby the angle of the beam of light from the output can be adjusted.

By using a lens assembly which has the adjustability referred to, with a fibre optic cable, enables the light to be transmitted from a remote location, and such lens assembly therefore provides a basis for overcoming the disadvantages of the known lighting arrangement referred to above, especially when a plurality of lens assemblies as referred to above and in accordance with the present invention, are used.

In this context, the body is preferably spherical and the mounting defines a spherical bearing enabling the body to be angularly adjusted within a cone of adjustment, and preferably the cone angle of the cone of adjustment is 90°. By such means, the lens assembly can be directed over a wide range of angles and in any of a plurality of planes.

In a preferred construction, the lens means comprises a sleeve carrying at least one lens the sleeve being slidable along its axis relative to the light input so as to vary the size of the light beam issuing from the light output. The lens focuses the beam of light at the light input, which is from the end of a fibre optic cable, and by sliding the sleeve so the beam width can be varied.

In a particular embodiment, the fibre optic cable has a remote end for illumination by a single light source is provided, and the output end may be split into a number of tails respectively connected to lens assemblies according to the invention.

Suitably where a plurality of lens assemblies is provided, the individual lens assemblies are mounted on a common bar or trunking in which the fibre optic cable is housed to provide a lighting apparatus.

By this means, there can be provided at the input end of the fibre optic cable a multi couloured rotateable filter disc interposed between the end of the fibre optic cable and the single light source, and there may be means for rotating the filter disc to cause the beams of light issuing from the light outputs to change colour.

In accordance with another aspect of the invention there is provided apparatus for illuminating a plurality of spaced locations comprising a plurality of lens units, fibre optic cable means having a plurality of output ends connected to said lens units respectively, and input end means, light source means for illuminating said input end means to cause focussed beams of light respectively to issue from said lens units which form said beams.

An assembly for directing a beam of light onto an object or an area for illumination purposes, comprising a body having a lens means and defining a light input and a light output, a mounting receiving the body for angular adjustment whereby the angle of the beam of light fron the output can be adjusted, said lens means being adjustable to vary the beam size and intensity.

An embodiment of the present invention will now be described, by way of example, with reference to the accompanying drawings, wherein:

FIG. 5 is an enlarged sectional elevation illustrating the lens mounting sleeve and lenses carried thereby as shown in FIG. 4;

FIG. 6 is a side elevation of the trunking shown in FIG. 3, toillustrate how the trunking may be mounted on a wall in a first fashion;

FIG. 7 is a view similar to FIG. 6 but showing how the trunking may be mounted on a wall in a second fashion; and FIG. 8 is a view to illustrate how the beam intensity from each lens unit may be varied.

Figure 1:
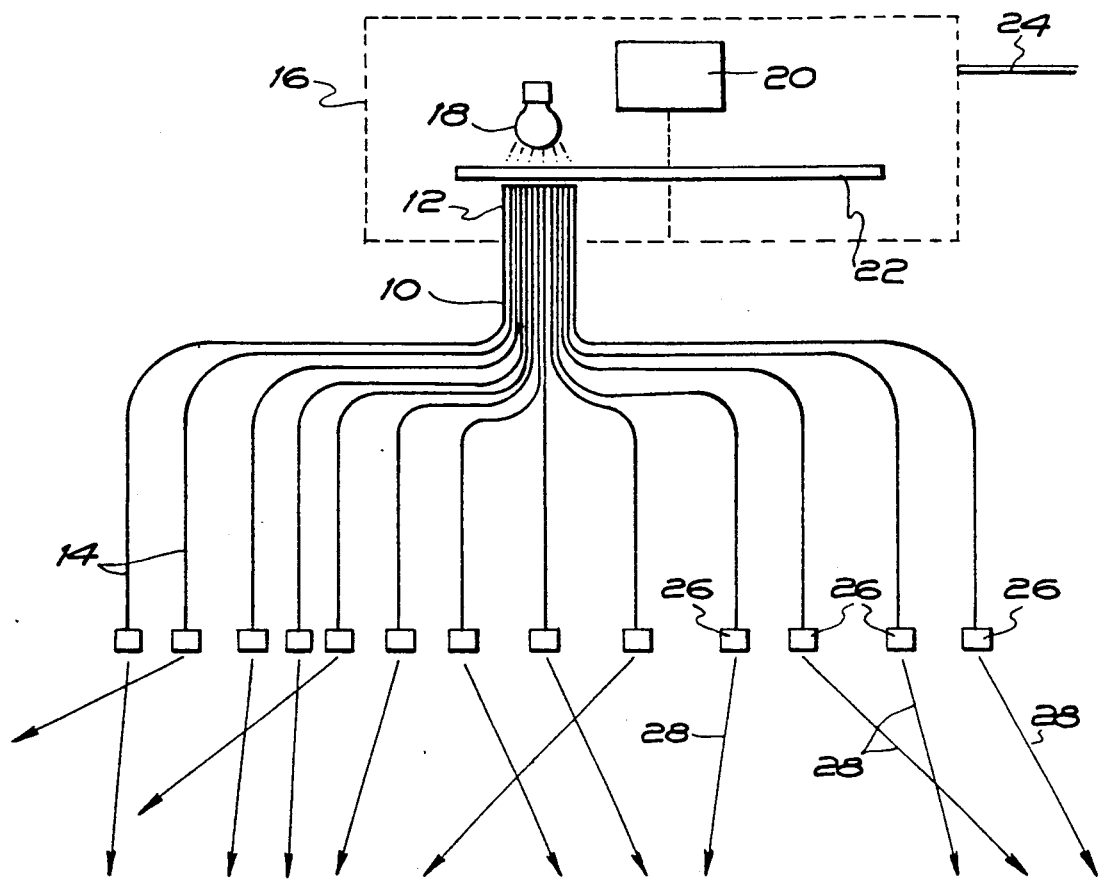
FIG. 1 is a diagrammatic view of a lighting arrangement according to the invention.

Referring to the drawings, and firstly to FIG. 1, a lighting arrangement comprises a fibre optic cable 10 having an input end 12 and a plurality of output ends of tails 14. The input end 12 of the fibre optic cable is housed in a casing 16 containing a light source 18 and, in this example, a motor 20 arranged to drive a filter disc 22 having a plurality of segments of different colour so that light transmitted from the source 18, which is a white light source, will be coloured according to the angular position of the disc 22 in relation to the light source 18, as the said disc 22 as shown in FIG. 1 lies between the light source 18 and the end 12 of the fibre optic cable. The casing 16 will contain the additional components as may be required for the connection of the motor 20 and the source 18 to a suitable power supply connected via lines 24.

At the tail ends 14 of the fibre optic cable are provided lens units 26 of which particular detail will be given hereinafter, but for the present it is to be noted that the lens units 26 are arranged to receive light issuing from the tail ends 14 of the fibre optic cable, and to focus such a light into individual beams 28. The beams 28 in FIG. 1 are shown as travelling in relatively random direction because in fact the individual lens units 26 are angularly adjustable so that the individual beams can be directed to a plurality of a spaced location to highlight articles located in such locations.

The lighting arrangment shown in FIG. 1 is particularly adapted for the illumination of objects and articles which ar located at a relatively short distance from the lens units 26 i.e. of the order of 500 mm or less, and therefore the lens units 26 do in fact perform the same role as do the pin spot light sources referred to hereinbefore, but with considerable advantages as compared to such individual pin spot light sources.

Figure 3:
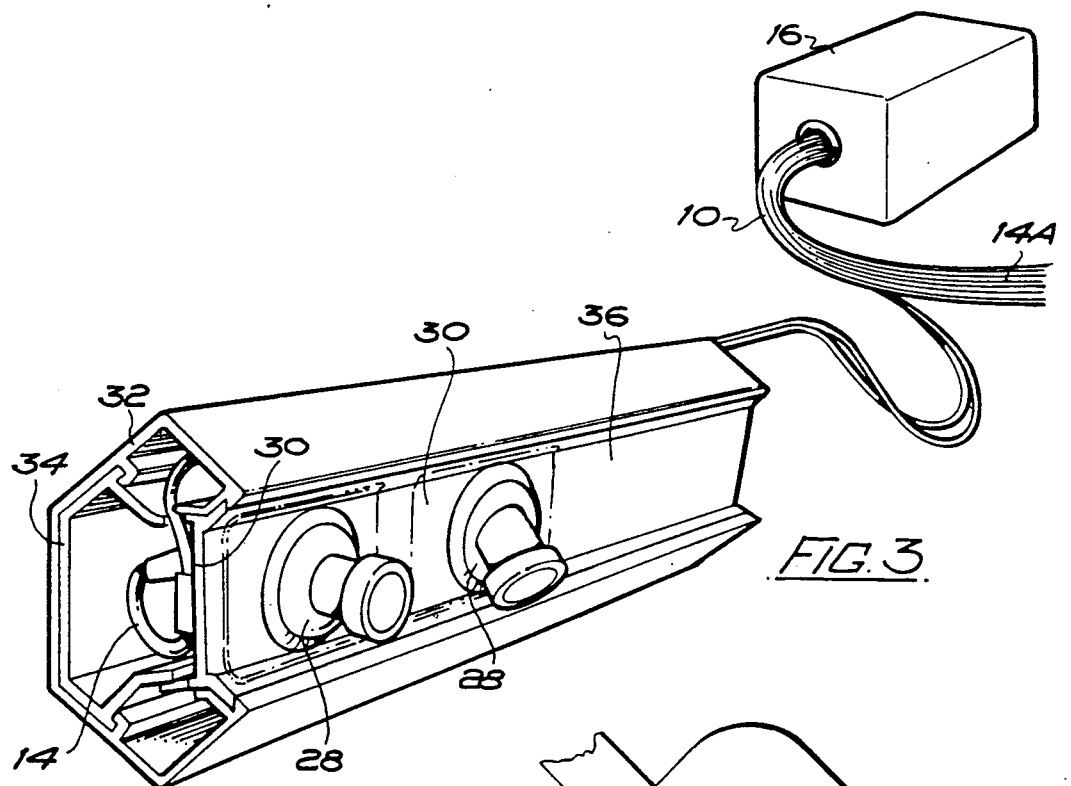
FIG. 3 is a perspective view of the lighting arrangement according to the invention.

If reference is now made to FIG. 3, this figure shows in perspective the arrangement shown in FIG. 1. The casing 16 is shown clearly as is the fibre optic cable 10 and shown are two of the lens units 28. The lens units are each carried by plastic extruded plates 30 which are springingly received in a plastic extruded trunking bar 32 which contains a clip bar 34 which cooperate to hold the plates 30 in position. FIG. 3 also shows that a blanking panel 36 may be used for the appropriate postioning of the plates 30, but it should be mentioned that the plates 30 can be positioned at any location along the length of the trunking 32.

Figure 2:
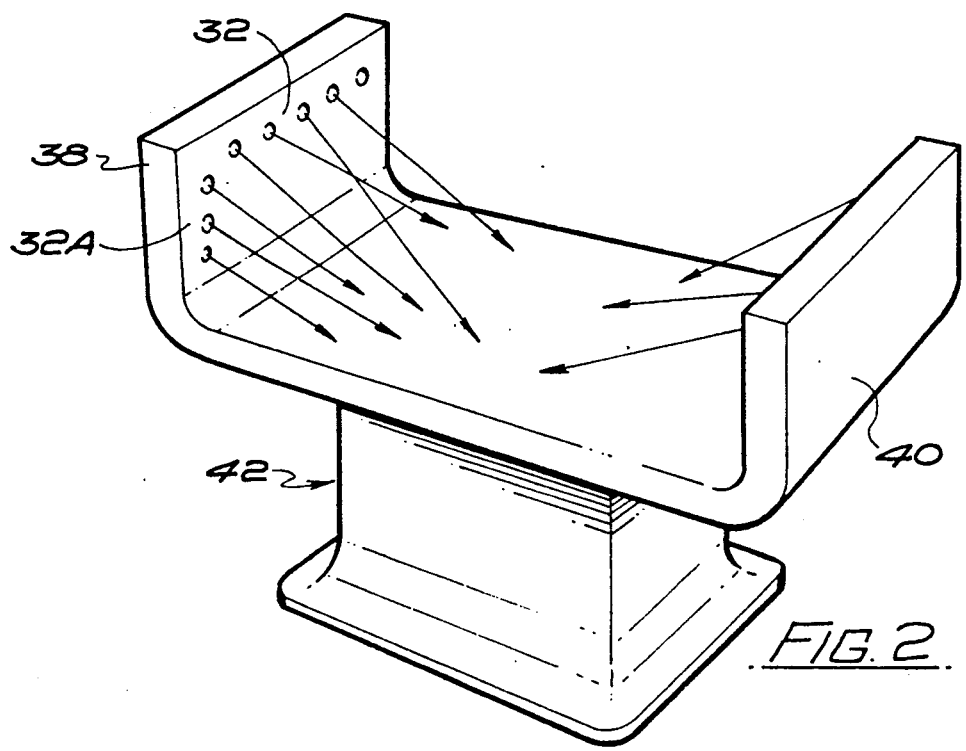
FIG. 2 is a prspective elevation of a display stand in which the lighting arrangement according to the present invention may be used.

The fibre optic cable 10 and the ends 14 of which one is shown in FIG. 3 are housed inside the trunking and therefore are out of site giving the assembly a particularly neat appearance. Nor do all of the ends 14 of the cable 10 need be directed to the same length of trunking 32, but as shown at 14A in FIG. 3, some of these ends may be directed to parallel or adjacent trunking assemblies having lens units 28. In particular, as shown in FIG. 2, there are two trunking assemblies 32 and 32A along each side 38 and 40 of the Y-shaped display case 42 shown in FIG. 2.

Figure 4:
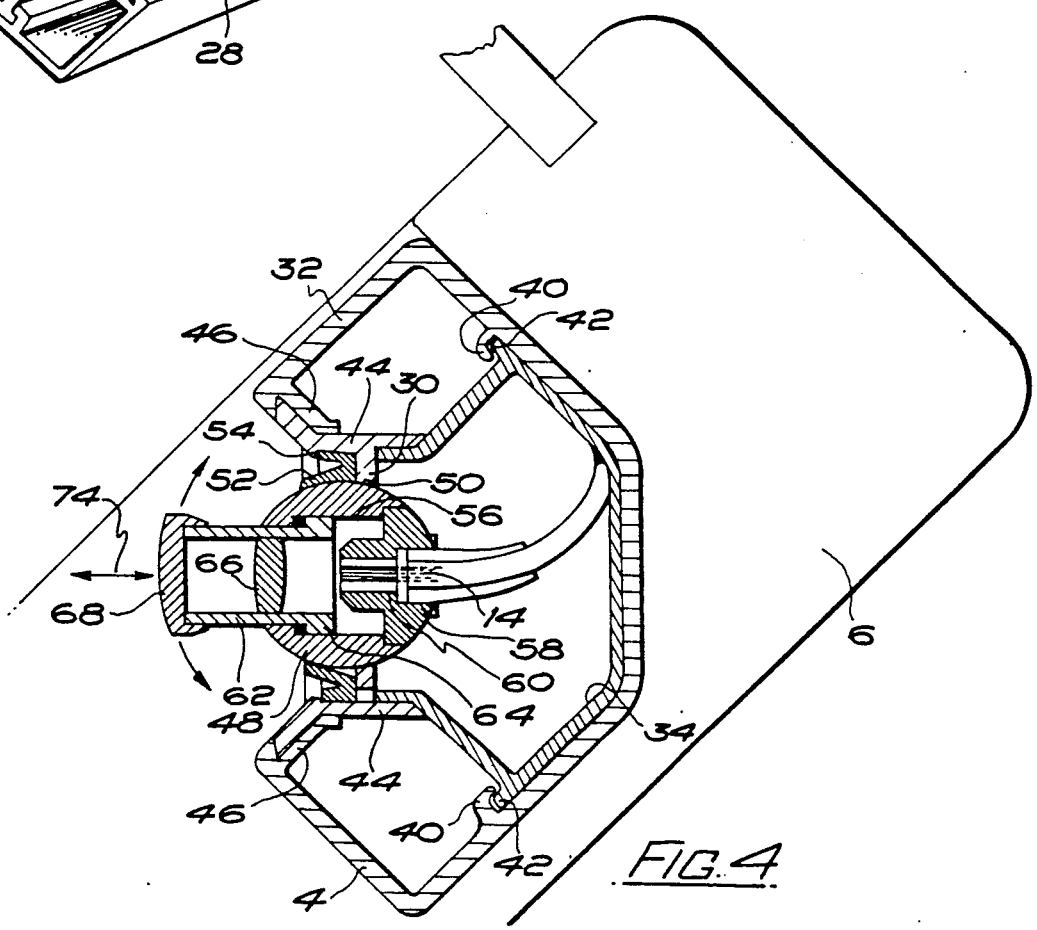
FIG. 4 is a cross sectional elevation of the supporting trunking and a lens unit of the arrangement shown in FIG. 3.

A detailed sectional view of each lens unit and its mounting is shown in FIG. 4, and the figure shows clearly the trunking bar 32 and the partition plate 30 of the lens unit. Additionally, the locking section 34 is shown, and it will be seen that it is held to the trunking 32 by means of ribs 40 on the inside of the trunking, and beadings 42 on the section 34, which are sprung into the ribs 40.

The partition plate 30 is provided with parallel rails 44 which clip into position on holding flanges 46 on the trunking 32.

The lens unit includes a spherical body 48 which fits in an aperture 50 in the plate 30, and a spring ring 52 which is sprung into position by locating behind a beading 54 on the plate 30 serves to create a spherical bearing for the body 48 so that it can swivel within a cone of adjustment in any direction and about the centre of the spherical body 48. The body 48 has a stepped bore 56 in the rear end of which is received a cap 58 having in its turn a bore 60, the bore 60 receiving the tail 14 of the fibre optic cable harness.

A sleeve 62 has an enlarged end 64 which is slidable in the bore 56 and inside the sleeve is a first lens 66 and at the front end is provided a second lens 68.

The optical arrangement is shown more clearly in FIG. 5, in which it will be seen that the lens 66 is fixed in position between the ends of the sleeve 62, whereas the lens 68 is in the form of a cap which fits over what is the front end of the sleeve 62. In an alternative arrangement the lens 66 is omitted and only angle lens 68, which is a simple plastic lens, may be used. The end face 14A of the fibre optic tail 14 is shown, and this forms a light emitting face from which a cone of light issues onto the lens 66. The lens pair 66 and 68 focus the light and provide a narrow beam which is directed to an object or location to be illuminated as described previously herein.

It will be appreciated that each lens unit comprising plate 30 with its rails 44, ring 52, body 48 and sleeve 62 can be inserted and removed in the trunking 32 as required depending upon how many units are to be carried by the trunking, and as many lengths of trunking as required are fitted to the display area such as a display case 42 shown in FIG. 2.

The trunking may be provided with end plates which clip into the ends in order to close same to prevent ingress of dust or the like.

FIG. 6 shows how the trunking 32 maybe mounted on a wall or other support surface 70 so that the main beam direction is horizontal, although the beam can be directed at any angle within the cone 72 illustrated, such cone having a 90° cone angle.

In the arrangement of FIG. 7, the trunking is mounted at 45° relative to the position shown in FIG. 6 so that the main beam direction is at a downwardly inclined angle of 45°, but again the lens unit can be adjusted so that the beam lies within a cone 72 of 90° cone angle.

FIG. 8 shows the arrangement wherein the beam mean direction is vertically downwards, and the figure also indicates how the area illuminated can be varied by sliding the sleeve 62 in and out of the bore 56 as indicated by arrow 74 in FIG. 4 and also in FIG. 8. The beam size can either be made large as indicated by reference 76 or small as indicated by numeral 78, or the size can be made anything in between the maximum and minimum as dictated by the position of the sleeve 62.

It is to be noticed that the trunking 32 is shaped as illustrated in FIG. 4 in order to enable the trunking readily to be mounted at the angles described herein so that the main beam direction is horizontal, inclined downwardly at 45° or inclined upwardly at 45° or is vertically downwards or indeed vertically upwards when the trunking is mounted on a vertical or horizontal wall surfaces. The trunking may be connected to the wall surfaces simply by using fixing screws which pass through apertures in the trunking.

Whilst the following dimensions and figures are given by way of example and provide a useful indication of particular utility of the invention, they are not to be considered as limiting as the principles of the invention can be embodied in any suitable application, and whilst it is preferred to use plastics material for all of the components illustrated, it is not necessary that this should be so.

The dimensions chosen for the particular embodiment provide that if a lens unit is located at 500 mm from a wall (dimension X in FIG. 8) the beam of light can be directed at any location within a circle of 1 meter diameter. The area of illumination can be varied by moving the sleeve as described herein and at a range of 500 mm, the lens unit will give a spot of light ranging from 150 mm dia. down to 50 mm dia. minimum, and as the spot of light becomes smaller, it of course becomes more intense, which makes the arrangement described particularly suitable for illuminating relatively small objects from a short distance. The range of lighting does however upon the ambient lighting conditions. In a shop window, the range would relative short because of the extraneous light, but in a dark environment a considerably greater range can be achieved which provides for dynamic lighting effects.

If the distance X is of the order of 1 meter, then the diameter of the spot of light can be varied between the order of 300 mm and 100 mm.

Because the light source 10 is remote from the lens units, the arrangement described has many advantages over the conventional pin spot illumination method. For example more individual lens units can be fitted into a small space. They can be as close as 40 mm and therefore 24 individual lens units can be located in a 1 meter length of trunking. The lens units remain cold since all the heat is generated in a light source which is positioned away from the display area, making the arrangement particularly suitable where heat sensitive subjects such as chocolates or delicate manuscripts are to be illuminated. Also the customer is protected from the hazard of heating of the glass which is usually associated with spot lighting in small display cabinets.

When there is a failure of the light source, only a single bulb has to be changed. By virtue of the use of the coloured filter disc as illustrated in FIG. 1, the lighting effect created by the lens units can be varied to give interesting dynamic effects. When such a filter disc is used in relation to the illumination of jewels, the jewels can be made to sparkle and change colour.

The arrangement described provides that the lens units are supported by a plastic trunking system which incorporates special channels for the management of the fibre optic cable, and provides a versatile means of mounting the pin points to suit many lighting applications. Adjustment of the beam intensity and beam angle can be effected simply by hand by grasping the sleeve 62 and manipulating same accordingly.

What is claimed:

1. An assembly for directing beams of light onto an object or area for illumination purposes, comprising a plurality of bodies each having a lens means and defining a light input and a light output, a fiber optic cable having a plurality of output ends at said respective light inputs so that the light transmitted along said cable passes through means so as to be focussed by the lens means into beams emanating from the light outputs, and a mounting bar receiving the plurality of said bodies for angular adjustment whereby the angles of the beams of light from the light outputs can be individually adjusted.

2. An assembly according to claim 1, wherein the body is spherical and the mounting defines a spherical bearing enabling the body to be angularly adjusted with a cone of adjustment.

3. An assembly according to claim 2, wherein the cone of adjustment has a 90° cone angle.

4. Apparatus for illuminating a plurality of spaced locations comprising a plurality of lens units, fiber optic cable means having a plurality of output ends connected to said lens units respectively, and input end means, light source means for illuminating said input end means to cause focussed beams of light respectively to issue from said lens units which form said beams, and the lens units being mounted on a hollow bar in which the fiber optic cable means is contained.

5. Apparatus for illuminating a plurality of spaced articles or locations comprising fiber optic cable means having input end means and a plurality of output ends, light source means for illuminating said input end means, a plurality of lens units at said respective output ends for focussing the light emanating from said output ends into a plurality of beams respectively for illuminating said articles or locations, a mounting bar containing said fiber optic cable means and carrying said lens units spaced longitudinally of the bar so as to be capable individually of angular adjustment to adjust the angularity of said beams relative to the bar.

6. Apparatus according to claim 5, further comprising at the input end means of the fiber optic cable means a multi-colored rotatable filter disc interposed between the input end means and the light source means, and means for rotating the filter disc to cause said beams of light to change color.

* * * * *

US005050047B1

REEXAMINATION CERTIFICATE (4112nd)

United States Patent [19]

Viner et al.

[11] B1 5,050,047

[45] Certificate Issued Jul. 11, 2000

[54] ASSEMBLIES AND APPARATUS FOR LIGHTING ESPECIALLY SPOTLIGHTING

[75] Inventors: Peter Viner, Wetherby, United Kingdom; Stuart L. Moore, 65 Summit Ridge Rd., Stamford, Conn. 06902

[73] Assignee: Stuart L. Moore, New York, N.Y.

Reexamination Request:
No. 90/003,941, Aug. 2, 1995

Reexamination Certificate for:
Patent No.: 5,050,047
Issued: Sep. 17, 1991
Appl. No.: 07/115,134
Filed: Oct. 30, 1987

[30] Foreign Application Priority Data

Oct. 30, 1986 [GB] United Kingdom .................... 8626033

[51] Int. Cl.[7] ........................................................ F21V 8/00

[52] U.S. Cl. ........................ 362/552; 362/125; 362/219; 362/238; 362/240; 362/250; 362/559

[58] Field of Search .................................. 362/32, 33, 61, 362/125, 219, 224, 235, 236, 237, 238, 239, 240, 250, 552, 559

[56] References Cited

U.S. PATENT DOCUMENTS

| | | | |
|---|---|---|---|
| 3,360,640 | 12/1967 | Seitz et al. | 362/32 X |
| 3,912,918 | 10/1975 | Feinbloom | 240/1.4 |
| 3,943,815 | 3/1976 | Gilbert | 84/293 |
| 4,118,760 | 10/1978 | Cohon | 362/239 |
| 4,394,714 | 7/1983 | Rote | 362/32 |
| 4,729,070 | 3/1988 | Chiu | 362/33 |
| 4,745,525 | 5/1988 | Sheehy | 362/32 |
| 4,760,507 | 7/1988 | Lasker et al. | 362/239 |
| 4,858,086 | 8/1989 | Pietrantonio et al. | 362/123 |
| 5,000,535 | 3/1991 | Churchill | 350/96.2 |
| 5,099,399 | 3/1992 | Miller et al. | 362/32 |

FOREIGN PATENT DOCUMENTS 2128909 10/1972 France .

*Primary Examiner*—Stephen F. Husar

[57] ABSTRACT

The invention provides a system of pinpoint lighting comprising a plurality of lens units supplied with light by the separated tail ends of a fiber optic cable of which the remote input end is supplied by a simple light source. The lens provides separate beams of light which are directed at individual articles such as individual items of jewelry in a display case. Each lens unit is adjustable so that the beam direction can be varied on the one hand and the beam intensity can be varied on the other hand.

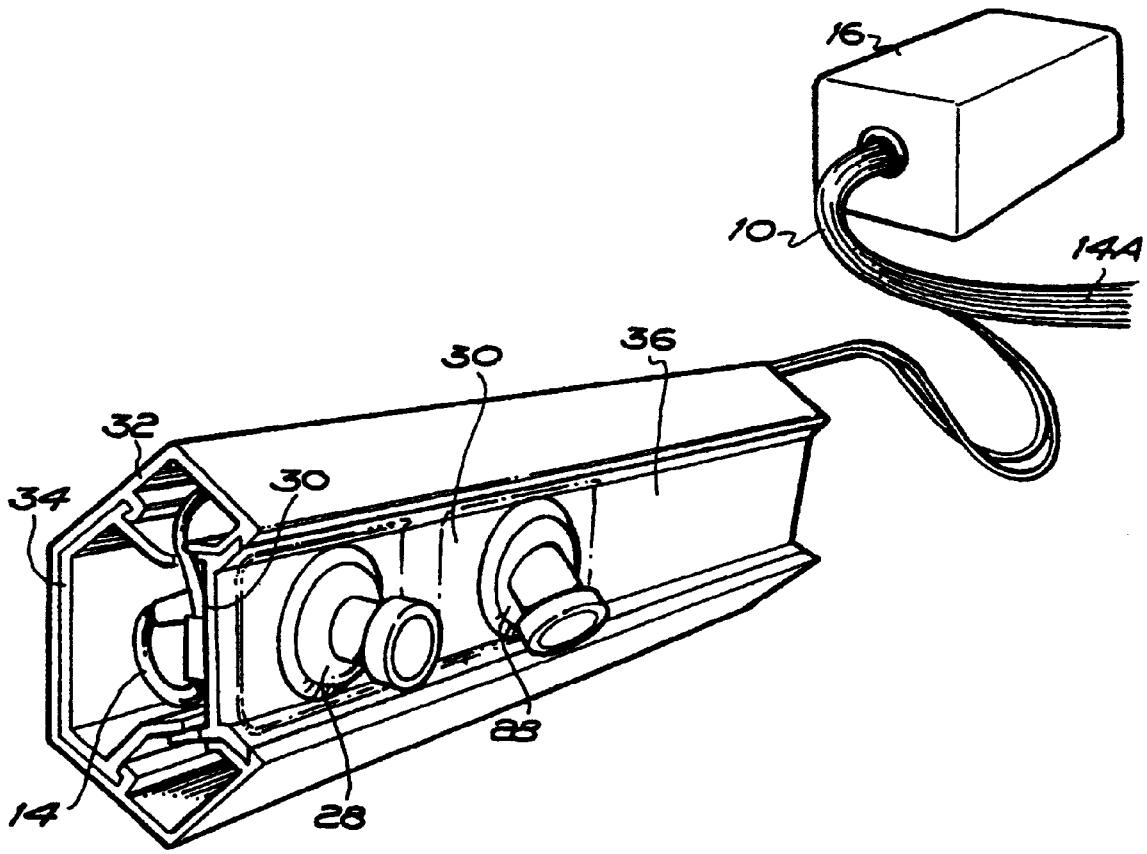

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 20–33:

However the use of individual light sources in this manner does create a number of problems including that the individual light sources are space consuming and heat up with continued use. If the pin spots are used for illuminating heat sensitive objects such as chocolates for delicate manuscripts, then there is a danger that such objects can be damaged as a result of the heat generated by the light sources. Furthermore, the heating of the light sources [can result in the heating of the light sources] can result in the heating of the glass [in closing] *enclosing* the display area, and such glass invariably is within reach of customers, and therefore there is a danger, however slight, of customers being burned by contact with the hot glass.

Column 3, lines 47–57:

The fibre optic cable 10 and the ends 14 of which one is shown in FIG. 3 are housed inside the trunking and therefore are out of [site] *sight* giving the assembly a particularly neat appearance. Nor do all of the ends 14 of the cable 10 need be directed to the same length of trunking 32, but as shown at 14A in FIG. 3, some of these ends may be directed to parallel or adjacent trunking assemblies having lens units 28. In particular, as shown in FIG. 2, there are two trunking assemblies 32 and 32A along each side 38 and 40 of the Y-shaped display case 42 shown in FIG. 2.

Column 5, lines 7–23:

The dimensions chosen for the particular embodiment provide that if a lens unit is located at 500 mm from a wall (dimension X in FIG. 8) the beam of light can be directed at any location within a circle of 1 meter diameter. The area of illumination can be varied by moving the sleeve as described herein and at a range of 500 mm, the lens unit will give a spot of light ranging from 150 mm dia. down to 50 mm dia. minimum, and as the spot of light becomes smaller, it of course becomes more intense, which makes the arrangement described particularly suitable for illuminating relatively small objects from a short distance. The range of lighting does however *depend* upon the ambient lighting conditions. In a shop window, the range would [relative] *be relatively* short because of the extraneous light, but in a dark environment a considerably greater range can be achieved which provides for dynamic lighting effects.

AS A RESULT OF REEXAMINATION, IT HAS BEEN DETERMINED THAT:

Claim 1 is cancelled.

Claims 2, 4 and 5 are determined to be patentable as amended.

Claims 3 and 6, dependent on an amended claim, are determined to be patentable.

New claim 7 is added and determined to be patentable.

2. [An assembly according to claim 1] *An assembly for directing beams of light onto an object or area for illumination purposes, comprising a plurality of bodies each having a lens means and defining a light input and a light output, a fiber optic cable having a plurality of output ends at said respective light inputs so that the light transmitted along said cable passes through means so as to be focussed by the lens means into beams emanating from the light outputs, and a mounting bar receiving the plurality of said bodies for angular adjustment whereby the angles of the beams of light from the light outputs can be individually adjusted*, wherein [the] *each* body is spherical and the mounting defines a spherical bearing enabling the body to be angularly adjusted with a cone of adjustment.

4. Apparatus for illuminating a plurality of spaced locations comprising a plurality of lens units, fiber optic cable means having a plurality of output ends connected to said lens units respectively, and input end means, light source means for illuminating said input end means to cause focussed beams of light respectively to issue from said lens units which form said beams, *the beams of light being variable to provide illumination of said spaced locations with light spots of different diameters*, and the lens units being mounted on a hollow bar in which the fiber optic cable means is contained.

5. Apparatus for illuminating a plurality of spaced articles or locations comprising fiber optic cable means having input end means and a plurality of output ends, light source means for illuminating said input end means, a plurality of lens units at said respective output ends for focussing the light emanating from said output ends into a plurality of beams respectively for illuminating said articles or locations, *at least one of said plurality of beams being variable between spot and flood lighting positions*, a mounting bar containing said fiber optic cable means and carrying said lens units spaced longitudinally of the bar so as to be capable individually of angular adjustment to adjust the angularity of said beams relative to the bar.

7. *Apparatus for illuminating a plurality of spaced locations comprising a plurality of lens units, fiber optic cable means having a plurality of output ends connected to said lens units respectively, and input end means, light source means for illuminating said input end means to cause focussed beams of light respectively to issue from said lens units which form said beams, said lens units permitting beams of light to illuminate said spaced locations with light spots of different diameters, and the lens units being mounted so that the fiber optic cables are not exposed, and so that the beams of light from the lens units can be angularly adjusted relative to each other.*

* * * * *